United States Patent
Olivier et al.

(10) Patent No.: US 7,801,218 B2
(45) Date of Patent: Sep. 21, 2010

(54) METHOD OR DEVICE FOR CODING A SEQUENCE OF SOURCE PICTURES

(75) Inventors: Yannick Olivier, Thorigne Fouillard (FR); Edouard Francois, Bourg des Comptes (FR); Franck Hiron, Chateaubourg (FR)

(73) Assignee: Thomson Licensing, Boulogne-Billancourt (FR)

( * ) Notice: Subject to any disclaimer, the term of this patent is extended or adjusted under 35 U.S.C. 154(b) by 1453 days.

(21) Appl. No.: 11/170,574

(22) Filed: Jun. 29, 2005

(65) Prior Publication Data

US 2006/0013307 A1   Jan. 19, 2006

(30) Foreign Application Priority Data

Jul. 6, 2004   (FR) .................................. 04 51445

(51) Int. Cl.
*H04N 7/12* (2006.01)
*H04N 5/14* (2006.01)

(52) U.S. Cl. .................................. 375/240.16; 348/699

(58) Field of Classification Search ................ 348/701, 348/419, 419.1, 699, 700, 584, 620, 720, 348/627, 908, 909, 451, 402.1, 409.1, 416.1, 348/413.1; 382/234, 275, 284, 276, 265, 382/254, 260, 232, 233, 242; 386/50, 113, 386/114, 68, 73; 375/240.1, 240.12, 240.16, 375/240.24, 240

See application file for complete search history.

(56) References Cited

U.S. PATENT DOCUMENTS

| 5,557,341 | A | 9/1996 | Weiss et al. |
| 6,026,195 | A * | 2/2000 | Eifrig et al. ................. 382/236 |
| 6,324,216 | B1 * | 11/2001 | Igarashi et al. ......... 375/240.14 |
| 6,483,876 | B1 | 11/2002 | Chang et al. |
| 6,591,398 | B1 * | 7/2003 | Kondo et al. .................... 714/2 |
| 6,731,684 | B1 * | 5/2004 | Wu ....................... 375/240.12 |
| 2006/0008007 | A1 * | 1/2006 | Olivier et al. .......... 375/240.16 |
| 2006/0193388 | A1 * | 8/2006 | Woods et al. .......... 375/240.16 |

OTHER PUBLICATIONS

Search Report.
Boeroczky et al. Motions Estimation for Wavelet Transform Coding, Journal on Communications, Profino, Budapest,HU vol. 45 May 1994.

* cited by examiner

*Primary Examiner*—Behrooz Senfi
(74) *Attorney, Agent, or Firm*—Robert D. Shedd; Paul P. Kiel; Guy H. Eriksen

(57) ABSTRACT

The method is characterized in that the pre-analysis phase performs correlation level calculations of the even and odd field blocks of the current picture with the even and odd blocks of the current picture with the even and odd field blocks of the reference picture based on motion vectors calculated during this phase and corresponding to the blocks to impose, during the coding mode decision stage and among the inter coding modes, the inter coding between fields of the same parity or of opposing parity or the inter coding between frames, according to the correlation levels.

13 Claims, 2 Drawing Sheets

METHOD OR DEVICE FOR CODING A SEQUENCE OF SOURCE PICTURES

This application claims the benefit, under 35 U.S.C. §119 of French Patent Application 0451445, filed Jul. 6, 2004.

FIELD OF THE INVENTION

The invention relates to a method or device for coding a sequence of source pictures, more specifically a method comprising a pel-recursive motion estimation type pre-analysis phase and a specific coding phase with pairing by blocks type motion estimation.

BACKGROUND OF THE INVENTION

The domain is video compression. We are particularly interested in block-based compression schemes, realizing an adaptive frame/field coding at a picture or block level, a coding providing a substantial gain in compression. This is for example the MPEG4 part-10 (H264) standard. In these classically implemented diagrams, the frame/field coding decision at the macroblock level is taken within the coding loop, introducing a double complexity with respect to a non-adaptive encoder that only operates in frame mode or field mode. This functionality is costly in terms of realization.

This coding decision depends, amongst other elements, on the temporal correlation and as a result, the motion estimations made by the coding circuit for the predictive coding, generally of the block matching type and of the hierarchical type.

For example in the case of a "block-matching" type hierarchical motion estimator for an encoder compatible with the H264 or MPEG4 part 10 standard, a motion vector field is calculated for each block size (4×4, 4×8, 8×4, 8×8, 8×16, 16×8, 16×16) and for each reference picture. For coding by macroblock pair, known as MBAFF, the English acronym for MacroBlock Adaptive Frame Field, the estimator provides, per macroblock, 1 motion vector field for the frame, 2 motion vector fields for the fields. Hence, for 16×16 size macroblocks, 41×3 motion vectors may be calculated for each reference picture, this number being multiplied if several reference pictures are used, such as in multi-reference mode. The choice amongst this multiplicity of coding possibilities is very costly in terms of calculations.

Secondly, in the example of the H264 standard, the decision as regards frame or field coding may be made independently for each vertical macroblock pair in the picture, at size 16×32 for the luminance block. This coding option is known as MBAFF, the acronym for "macroblock-adaptive frame/field coding". For a macroblock pair coded in frame mode, each macroblock contains the lines of the interlaced picture. For a macroblock pair coded in field mode, the upper macroblock contains the lines of the upper field or odd field, and the lower macroblock contains the lines of the lower field or even field.

The coding mode decision, which may be based on the measurement of coding costs and the distortion associated with the mode, is made at the level of the macroblock pair and not at the macroblock level as for the MPEG2 standard, hence multiplying the possible combinations and thus the calculation load.

One solution to reduce the calculations consists in choosing between fields and frames for low resolution pictures, to limit the calculations at higher resolutions. These premature choices, made at the upper levels of the pyramid and hence at lower resolutions than those of source pictures, do not provide good results, due to the insufficient vertical definition, an upper field, lower field selection corresponding to a shift in one line.

SUMMARY OF THE INVENTION

The invention aims to overcome the disadvantages described above.

For this purpose, one of the objects of the invention is a method of coding a sequence of source pictures comprising a pre-analysis phase with pel-recursive type motion estimation between the current picture and a reference picture, and an actual coding phase by picture blocks, with a block matching motion estimation stage, between the current picture and the reference picture, followed by a coding mode decision stage such as the intra mode, the inter mode between fields of the same parity or opposing parity or between frames characterized in that the pre-analysis phase performs correlation level calculations for the even and odd field blocks of the current picture with the even and odd field blocks of the reference picture based on the motion vectors calculated during this phase and corresponding to the blocks to impose, during the coding mode decision stage and amongst the inter coding modes, the inter coding between fields of the same parity or opposing parity or the inter coding between frames, according to correlation levels.

According to a particular implementation, the inter coding between fields is imposed when the correlation level between fields of opposing parity is lower at the correlation level between fields of the same parity.

According to a particular implementation, the pre-analysis phase also implements correlation calculations between a frame block of the current picture with a frame block of the reference picture to determine the coding mode between fields or between frames according to the correlation levels.

According to a particular implementation, the correlation calculation consists in a calculation of the following DFD value:

$$DFD = \sum_{i,j=0}^{i,j=15} |pix_c(i,j) - pix_{pred}(i,j)|$$

$pix_c(i,j)$ corresponding to the luminance value of one pixel of the line i and the column j of a current block, $pix_{pred}(i,j)$ corresponding to the luminance value of a pixel of the line i and column j of a block designated by the motion vector in the reference picture or the predicted block.

According to a particular implementation, a picture block is partitioned into an upper block and a lower block, the upper block corresponding to the upper field and the lower block to the lower field, or vice versa, the inter mode between frames consisting in a choice of the reconstructed upper or lower field of the reference picture for each of the upper and lower blocks and this choice being dependent on the correlation measures on the entire picture block.

According to a particular implementation, the pre-analysis phase includes a noise reduction phase by motion-compensated filtering based on motion calculated by the estimation of the pel-recursive type motion estimation.

According to a particular implementation, the block matching motion estimation is of hierarchical type.

According to a particular implementation, the pel-recursive type motion estimation is implemented on a source picture of lower resolution.

According to a particular implementation, the motion vectors calculated during the pre-analysis phase and corresponding to the blocks are those calculated for the pixels relating to the blocks.

According to a particular implementation, the motion vectors calculated during the pre-analysis phase and corresponding to the blocks are obtained from the median value or the average value of the motion vector components calculated for the pixels relating to the blocks.

According to a particular implementation, the correlation calculations are performed on several reference pictures and the pre-analysis phase implements a selection of one more reference pictures according to the correlation values.

The invention also relates to a coding device containing a pre-analysis circuit with a pel-recursive type motion estimator and an actual coding circuit by picture blocks comprising a picture block matching motion estimator connected to a coding mode decision circuit, characterized in that the pre-analysis circuit performs correlation calculations of the even and odd field blocks of the current frame with even and odd frame blocks of the reference picture based on the motion vectors calculated by the pel-recursive type motion estimator to impose to the coding mode decision circuit and among the inter coding modes, the inter coding between fields of the same parity or of opposing parity or the inter coding between frames, according to correlation levels.

According to a particular implementation, the pre-analysis circuit transmits coding mode information to the block matching motion estimation circuit to define a motion estimation on the fields and/or the frame relative to the reconstructed picture.

A pre-selection of the frame or field coding mode is carried out prior to the coding loop using the motion vector fields calculated by the motion estimator of the motion-compensated filtering circuit realising, before the actual coding, a noise reduction on the source picture.

Hence, the complexity of implementing frame/field adaptive coding at the macroblock level is reduced. The coding decision circuit calculations for the coding module are simplified.

BRIEF DESCRIPTION OF THE DRAWINGS

Other specific features and advantages will emerge clearly from the description, the description provided as a non-restrictive example and referring to the annexed drawings wherein.

DETAILED DESCRIPTION OF PREFERRED EMBODIMENTS

Figure 1:
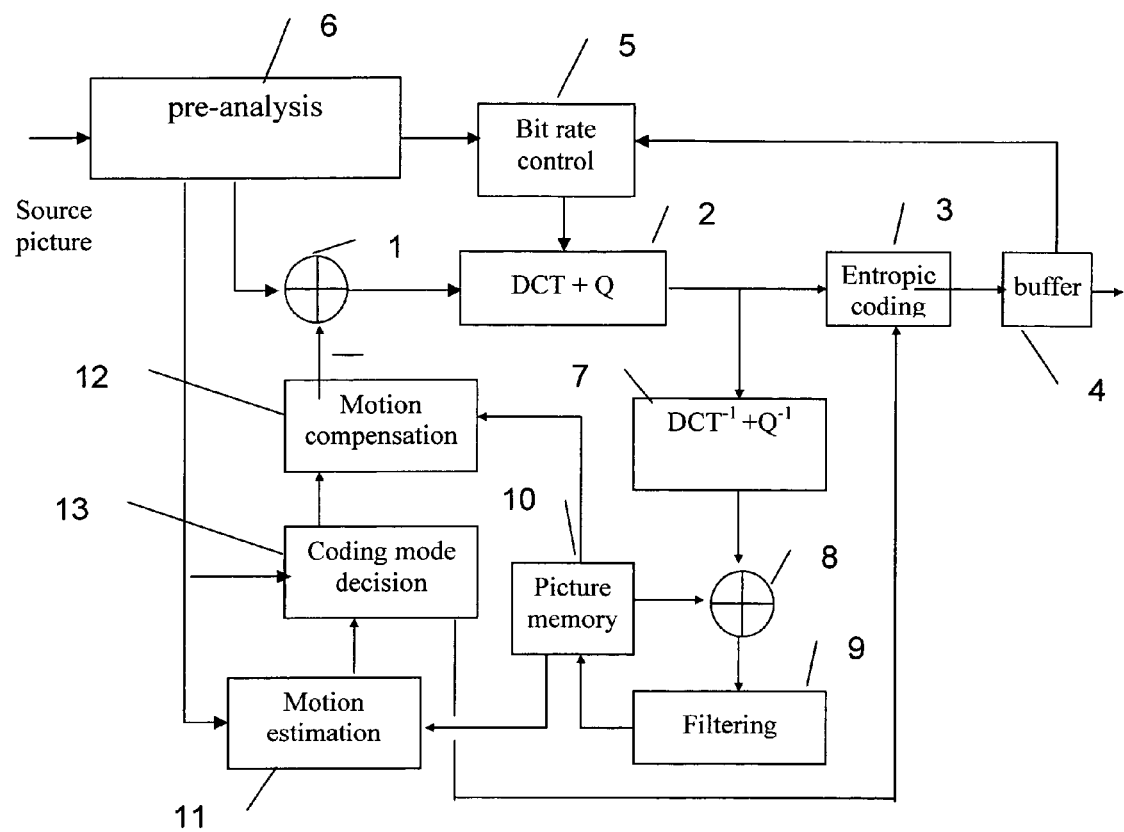
FIG. 1, a block diagram of an encoder according to the invention.

The digital video data of the source picture is received at the input of the encoder to be transmitted to a pre-analysis circuit 6. The pictures are filtered and transmitted, by picture block, to a first input of a subtractor 1. According to the coding mode, intra or inter, the subtractor 1 transmits the information relating to the current block received on its first input or subtracts from the latter the latest information corresponding to a predicted block available on its second input. The outgoing data of the subtractor is transmitted to a discreet cosine and quantization transformation circuit 2. The quantized outgoing coefficients of this circuit undergo entropic coding through the entropic encoder 3 then are memorized in a buffer memory 4. The filling level of this memory is transmitted to a bit rate control circuit 5, which also receives data from the pre-analysis circuit, and which affects the quantization step of the quantizer 2.

The current picture is reconstructed to provide the predicted blocks. Hence, the quantized coefficients undergo an inverse quantization and an inverse discreet cosine transformation through the referenced circuit 7 to give the decoded luminance values.

The adder 8 enables the predicted block to be added to the decoded coefficient block, if it is coded in inter mode. The reconstructed block is filtered by the filtering circuit 9 before being memorized in the picture memory 10 that memorizes the reconstructed current picture.

A hierarchical motion estimator 11 receives the information relative to the decoded or reconstructed picture memorized by the picture memory 10 and the information relative to the current macroblock of the source picture from the pre-analysis circuit 6. It performs a correlation calculation between this current macroblock and the reconstructed picture according to a known principle, to provide the motion vectors. These vectors are transmitted to a coding decision circuit 13 that implements coding cost calculations to determine the coding mode. This coding mode and, if necessary, the corresponding motion vectors are transmitted to a motion compensation circuit 12 that realizes the motion compensation of the reconstructed picture to provide a predicted picture block from this reconstructed picture. The motion vectors are also transmitted to the entropic coding circuit 3 for their coding and transmission to the decoder.

In a more detailed manner, at input of the encoder there is a pre-analysis circuit 3 containing a resolution reduction circuit, a pel-recursive type motion estimation circuit and a filtering circuit. These circuits enable noise reduction on the picture to be implemented before it is coded. In this field, it is recognized that a pel-recursive type motion estimation is more adapted to noise reduction than to a motion estimation by blocks. It is thus this type of algorithm that is implemented in this pre-analysis phase of the encoder.

According to the invention, the pre-analysis circuit carries out the correlation calculations to provide frame/field coding decision information to the coding mode decision circuit 13. It realises a field/frame mode pre-selection to simplify the calculations made by the decision module, as described at a later stage.

The source pictures of the picture sequence received at the input of the encoder are sub-sampled and possibly interpolated by the pre-analysis circuit to provide pictures of lower spatial resolution. The pel-recursive type motion is estimated by this pre-analysis circuit prior to the actual encoding of the pictures. It is thus calculated per pixel on a picture of lower resolution, whose size is divided in two horizontally and vertically in our example. This estimation can also provide, in advance, a certain amount of information useful for the encoding module, such as detection of areas in motion, unpredictable areas, preferred prediction direction, etc.

A motion compensated filtering action, based on this motion estimation, is then implemented on the full resolution pictures. This filtering reduces the noise of the picture and thus improves the encoder efficiency The pre-analysis circuit may be used to define the GOP structure of the sequence to be coded, i.e. the type of pictures, inter or intra, reference pictures, bi-directional, etc. This term GOP is the acronym for "Group Of Pictures", defined in the MPEG standard.

The pre-analysis is carried out on a pre-defined number of pictures. The delay period between the pre-analysis and the actual picture coding can be in the order of the group of pictures considered for the bit rate control. It corresponds for example to one or several GOPs for the MPEG standard.

In our example, the motion estimation circuit 11 is based on a hierarchical structure and on a block matching approach. The current macroblock is compared to a decoded picture, constructed according to a pyramid of increasing resolution, beginning at the lowest resolution of the pyramid to the highest resolution level. The motion vector fields are estimated for each resolution level, from the lowest level to the highest level, the estimations made at one level can be used as a prediction for the higher level. The pyramids depend on the different coding modes of the coding circuit. Hence, there are pyramids for the frames, for the fields, and this, for a given reference picture. In the multiple reference approach, this number is thus multiplied.

The motion vectors are calculated for the macroblock pairs in relation to a frame and for each macroblock of these macroblock pairs in relation to the fields.

This filtering circuit 9, in the coding loop, realizes a filtering of the reconstructed picture to reduce the effects of the blocks. It is this filtered picture that is memorized in the picture memory 10.

The pre-analysis circuit 6 is connected to the bit rate control circuit 5 to provide it with GOP structure information and coding cost information by picture type to simplify bit rate control which can thus integrate information ex post facto. The pre-analysis circuit determines, during a first pass in intra mode, the complexity of the pictures, in terms of coding and transmits a coding cost estimation per picture type to the control circuit so that the latter can calculate the quantization steps of the DCT+Q circuit.

The coding mode decision circuit implements coding cost or energy calculations to select the coding mode, intra mode, inter mode, bi-directional, reference picture choice, etc. It eliminates, among the potion vectors received from the motion estimator, those corresponding to the unselected modes by the pre-analysis circuit, and selects, among the those remaining, the motion vectors providing the lowest coding cost.

Figure 2:
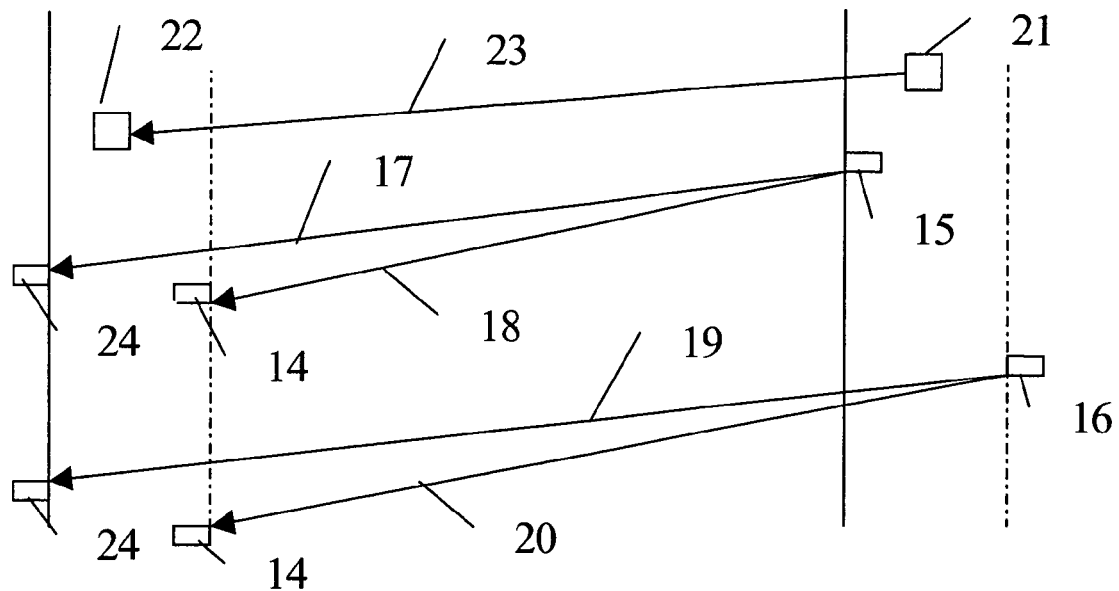
FIG. 2, 5 motion vectors calculated by the motion estimator of the pre-analysis circuit, in a first solution, FIG. 3, 4 motion vectors calculated by the motion estimator of the pre-analysis circuit, in a second solution.

FIG. 2 symbolizes the motion estimations implemented by the pel-recursive type motion estimator for the different type of macroblock coding.

The frame is divided into two interlaced fields that are shown at different intervals. The first field in time, known as the upper field or odd field, appears on each odd line of the frame while the second field, known as the lower field or even field, appears on each even line of the frame. The two fields form the frame.

16×16 macroblocks referenced 24 belong to a first upper field shown in solid lines, and a 16×16 macroblock referenced 15 belongs to the next upper field shown in solid lines.

16×16 macroblocks referenced 14 belong to a first lower field shown in dotted lines, and a 16×16 macroblock referenced 16 belongs to the next lower field shown in dotted lines.

The pair of macroblocks constituted by two 16×16 macroblocks referenced 21 and 22 belong to the interlaced picture or the frame and are thus constituted by a succession of lines of upper and lower fields.

If the pair of macroblocks is coded in frame mode and is thus constituted by a succession of even and odd lines; reference 21 and the motion vector reference 23 points to the previous interlaced picture, designating a 16×32 macroblock reference 22. The interpolation for the motion estimation is implemented by using the even and odd lines.

If the macroblock pair is coded in field mode, it is then constituted by an upper macroblock constituted by odd lines and a lower macroblock constituted by even lines, respectively referenced 15 and 16. The motion vector for the upper macroblock can point either to a macroblock of the upper field or previous odd field, vector referenced 17, or to a macroblock of the lower field or previous even field, vector referenced 18. The motion vector for the lower macroblock may point to the macroblock of the previous even field, vector referenced 20, or to a macroblock of the previous odd field, vector referenced 19.

The picture used for the motion estimation is a picture of lower resolution than the source picture. The sub-sampling and filtering are implemented by the pre-analysis circuit. The picture of lower resolution is memorized and a pel-recursive type motion estimation is realized between this current picture and a previous reference picture, memorized.

The motion vector field, a pixel motion vector, is processed in a manner to match one motion vector per macroblock. For example all pixel motion vectors relative to a macroblock of the full resolution picture are taken into account and the median motion vector of this set of motion vectors is assigned to this macroblock. It is also possible to choose the average values of these motion vectors. A sub-sampling may also be implemented such that one pixel of the sampled picture corresponds to a macroblock of the original picture, one motion vector thus corresponding to one macroblock.

FIG. 2 corresponds to a first solution in the pre-selection of the coding modes.

The motion estimator of the pre-analysis circuit 6 calculates 5 motion vector fields for each picture. These vectors correspond to the motion:

between the current frame and the previous frame between the current even field and the previous even field between the current even field and the previous odd field between the current odd field and the previous even field between the current odd field and the previous odd field.

It realizes correlation calculations in relation to these motion vector fields, for each of the macroblocks.

Hence, for each field of the current picture, it calculates the sums of the inter-field differences for the reference fields of the same parity. Based on the double macroblock of the frame or interlaced picture corresponding to each of these fields, of 32 lines, 16 columns, the following is obtained for a macroblock of the even field:

$$DFD_{even, sameparity} = \sum_{i,j=0}^{i,j=15} |pix_c(2i, j) - pix_{pred}(2i, j)|$$

and the following for a macroblock of the odd field:

$$DFD_{odd, sameparity} = \sum_{i,j=0}^{i,j=15} |pix_c(2i+1, j) - pix_{pred}(2i+1, j)|$$

where $pix_{pred}$, the predicted value based on the motion vector. For each value i of a line of the double macroblock of the frame, the j column is incremented from 0 to 15. The 2i lines correspond to the macroblock of the even field extracted from the double macroblock and the 2i+1 lines to the macroblock of the odd field.

Equally, for each of the frames of the current picture, it calculates the sums of the inter-field differences for the ref erence fields of opposing parity. The following is obtained for a macroblock of the current even field:

$$DFD_{even, oppos.parity} = \sum_{i,j=0}^{i,j=15} |pix_c(2i, j) - pix_{pred}(2i+1, j)|$$

and for a macroblock of the current odd field:

$$DFD_{odd, oppos.parity} = \sum_{i,j=0}^{i,j=15} |pix_c(2i+1, j) - pix_{pred}(2i, j)|$$

Finally, for a frame, for a double macroblock, it calculates the sum of the inter-frame differences:

$$\begin{aligned} DFD_{picture} &= \sum_{i,j=0}^{i,j=15} |pix_c(i, j) - pix_{pred}(i, j)| + \\ &\quad \sum_{i,j=0}^{i,j=15} |pix_c(i+16, j) - pix_{pred}(i+16, j)| \\ &= \sum_{i,j=0}^{i=31,j=15} |pix_c(i, j) - pix_{pred}(i, j)| \end{aligned}$$

where $pix_{pred}$, the predicted value based on the motion vector.

For each field of the picture, the calculation circuit selects the parity of the reference field generating the lowest DFD.

$$DFD_{even}^{min} = DFD_{even, sameparity} \begin{array}{c} sameparity \\ < \\ > \\ opp \cdot parity \end{array} DFD_{even, oppos.parity}$$

$$DFD_{odd}^{min} = DFD_{odd, sameparity} \begin{array}{c} sameparity \\ < \\ > \\ oppos \cdot parity \end{array} DFD_{odd, oppos.parity}$$

For example for the 1$^{st}$ expression, if $DFD_{even, same parity}$ is of a lower value than $DFD_{even, oppos. parity}$, it is $DFD_{even, same parity}$ that is selected. If it has a higher value, the $DFD_{even, oppos. parity}$ is selected.

The minimum DFD values of each field are added together:

$$DFD_{field} = DFD_{even}^{min} + DFD_{odd}^{min}$$

The selection between the field coding and the frame coding is implemented by comparing the corresponding DFD, the DFD relative to the field coding being penalized by a value $\lambda$. This $\lambda>0$ parameter enables the additional coding cost in field mode, the two motion vectors to transmit, to be taken into account:

$$DFD_{field} + \lambda \begin{array}{c} field \\ < \\ > \\ picture \end{array} DFD_{picture}$$

Hence, the pre-analysis circuit selects, according to previous results, the most advantageous coding modes. It transmits this information to the coding mode decision circuit, which restricts its calculations to the selected coding modes only.

According to whether the mode selected by the pre-analysis circuit is coding simply at the field or frame level, the coding cost calculations made by the coding mode decision circuit is then restricted to field mode or frame mode.

This limitation may be extended even further. Hence, when the field mode is selected, the pre-analysis circuit can impose, for the coding mode, the even field or the odd field and this, for each of the macroblocks constituting the macroblock pair.

Figure 3:
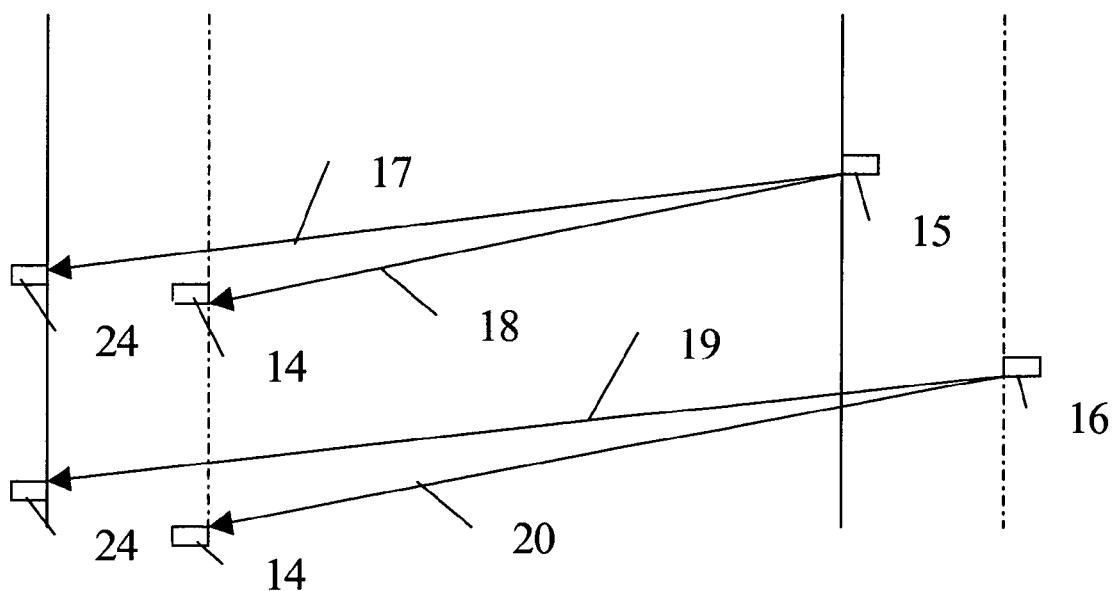

A second, simpler, solution corresponds to FIG. 3. It consists, for the motion estimator of the pre-analysis circuit, of calculating the 4 vector fields relative to the fields, referenced 17, 18, 19, 20 on the figure and, for each of the fields of the current picture, the sums of the different inter-fields for the reference fields of the same parity and opposing parity:

$$DFD_{even, sameparity} = \sum_{i,j=0}^{i,j=15} |pix_c(2i, j) - pix_{pred}(2i, j)|$$

$$DFD_{odd, sameparity} = \sum_{i,j=0}^{i,j=15} |pix_c(2i+1, j) - pix_{pred}(2i+1, j)|$$

$$DFD_{even, oppos.parity} = \sum_{i,j=0}^{i,j=15} |pix_c(2i, j) - pix_{pred}(2i+1, j)|$$

$$DFD_{odd, oppos.parity} = \sum_{i,j=0}^{i,j=15} |pix_c(2i+1, j) - pix_{pred}(2i, j)|$$

The frame choice is generally made where the two macroblocks constituting the pair of macroblocks undergo the same motion of a field to the field of the same parity. Hence, if for one of the fields of the current picture, the DFD corresponding to the field of opposing parity is lower than the DFD corresponding to the field of the same parity, the macroblock coding choice is field mode. Indeed, in this case, it is very likely that the macroblock of the even field and the macroblock of the odd field constituting the pair of macroblocks does not undergo this same motion, and therefore that the frame mode is less advantageous. For example, this is the case for a large motion in the temporal space between two fields, which is 20 ms.

Otherwise, i.e. if the motion vectors relative to fields of the same parity are neighbouring, the frame mode is selected by the pre-analysis circuit.

In this solution, it is thus unnecessary for the pre-analysis circuit 6 to implement a motion estimation at the frame level to select the coding modes to test by the coding decision circuit 13.

Another solution consists in calculating the frame vector field based on the field vectors calculated by the motion estimator of the pre-analysis circuit. The motion vectors calculated for the fields are used to calculate the corresponding DFDs relative to the double macroblock of the frame, the vector selected being that providing the lowest DFD difference which is thus the $DFD_{frame}$. We return to the case of the first solution for calculating DFDs, but in this case, the motion estimator must not estimate the motions between frames.

These are embodiments. Of course, the invention applies to all types of picture partitioning into blocks or macroblocks for which a correlation is sought. An intermediate stage may consist in a partitioning of these blocks or macroblocks and a correlation search for each of the parts of these blocks or macroblocks.

The motion estimators may be of another type than pel-recursive or hierarchical type without leaving the field of the invention.

The information relating to the selection of the coding mode transmitted to the coding selection circuit 13 can also be transmitted to the hierarchical motion estimation circuit 11. Thus, this circuit can restrict its motion estimation calculations only to the selected modes, field or frame, thus reducing the calculation volume of the motion estimator.

The applications relate to the compression of digital data for transmission or video information storage.

What is claimed is:

1. Method for coding a sequence of source pictures containing a pre-analysis phase performing noise filtering by implementing pel-recursive type motion estimation between the current picture and a reference picture, and an actual coding phase by picture blocks, with a block matching motion estimation stage between the current picture and the reference picture, followed by a coding mode decision stage to decide a coding mode among coding modes comprising the intra mode, the inter mode between fields of the same parity or opposing parity or between frames, wherein the pre-analysis phase performs correlation level calculations for the even and odd field blocks of the current picture with the even and odd field blocks of the reference picture based on the motion vectors calculated at this phase and corresponding to the blocks to impose, during the coding mode decision stage and among the inter coding modes, the inter coding between fields of the same parity or opposing parity or the inter coding between frames, according to correlation levels.

2. Method according to claim 1, wherein the inter coding between fields is imposed when the correlation level between fields of opposing parity is lower than the correlation level between fields of the same parity.

3. Method according to claim 1, wherein the pre-analysis phase also implements correlation calculations between a frame block of the current picture with a frame block of a reference picture to determine the coding mode between fields or between frames according to the correlation levels.

4. Method according to claim 1, wherein the correlation calculation consists in a calculation of the following DFD value:

$$DFD = \sum_{i,j=0}^{i,j=15} |pix_c(i,j) - pix_{pred}(i,j)|$$

$pix_c(i,j)$ corresponding to the luminance value of one pixel of the line i and column j of a current block, $pix_{pred}(i,j)$ corresponding to the luminance value of a pixel of the line i and column j of a block designated by the motion vector in the reference picture or the predicted block.

5. Method according to claim 1, wherein a picture block is partitioned into an upper block and a lower block, the upper block corresponding to the upper field and the lower block to the lower field, or vice versa, wherein the inter mode between fields consists of a choice of the reconstructed upper or lower field of the reference picture for each of the upper and lower blocks and wherein this choice depends on the correlation measurements on the entire picture block.

6. Method according to claim 1, wherein the pre-analysis phase contains a noise reduction phase by motion-compensated filtering based on the motion calculated by the pel-recursive type motion estimation.

7. Method according to claim 1, wherein the block matching motion estimator is of the hierarchical type.

8. Method according to claim 1, wherein the pel-recursive type motion estimation is implemented on a source picture of lower resolution.

9. Method according to claim 1, wherein the motion vectors calculated during the pre-analysis phase and corresponding to the blocks are those calculated for the pixels relative to the blocks.

10. Method according to claim 1, wherein the motion vectors calculated during the pre-analysis phase and corresponding to the blocks are obtained from the median value or the average value of the motion vector components calculated for the pixels relating to the blocks.

11. Method according to claim 1, wherein the correlation calculations are performed on several reference pictures and wherein the pre-analysis phase implements a selection of one reference picture or pictures according to the correlation values.

12. Coding device for the implementation of the method of claim 1, containing a pre-analysis circuit with a pel-recursive type motion estimator for noise filtering and an actual coding circuit by picture blocks containing a picture block matching motion estimator connected to a coding mode decision circuit, wherein the pre-analysis circuit performs correlation calculations of the even and odd field blocks of the current picture with the even and odd field blocks of the reference picture based on the motion vectors calculated by the pel-recursive type motion estimator to impose on the coding mode decision circuit and among the inter coding modes, the inter coding between fields of the same parity or opposing parity or the inter coding between frames, according to correlation levels.

13. Device according to claim 12, wherein the pre-analysis circuit transmits coding mode information to the block matching motion estimation circuit to define a motion estimation on the fields and/or the frame relative to the reconstructed picture.

* * * * *